(12) United States Patent
Poo

(10) Patent No.: US 7,004,066 B2
(45) Date of Patent: Feb. 28, 2006

(54) TABLE TOP AND PROCESS OF MAKING THE SAME

(76) Inventor: Hao-Wei Poo, 14F, No. 28, Tung-Hsing Rd., Taipei City (TW)

( * ) Notice: Subject to any disclaimer, the term of this patent is extended or adjusted under 35 U.S.C. 154(b) by 307 days.

(21) Appl. No.: 10/411,197

(22) Filed: Apr. 11, 2003

(65) Prior Publication Data

US 2004/0200391 A1 Oct. 14, 2004

(51) Int. Cl.
*A47B 13/00* (2006.01)

(52) U.S. Cl. .................................................. 100/161

(58) Field of Classification Search ................ 108/161; 264/240, 241, 299, 246, 279.1; 428/176, 428/128, 317.1; 156/242, 245

See application file for complete search history.

(56) References Cited

U.S. PATENT DOCUMENTS

| | | | | |
|---|---|---|---|---|
| 3,062,604 A | * | 11/1962 | Hodgen | 108/161 |
| 3,150,032 A | * | 9/1964 | Rubenstein | 108/161 |
| 3,164,110 A | * | 1/1965 | Bofinger | 108/161 |
| 3,174,893 A | * | 3/1965 | Church et al. | 108/161 |
| 3,212,952 A | * | 10/1965 | Turner | 108/161 |
| 4,761,931 A | * | 8/1988 | Schrunk | 108/161 |
| 6,012,787 A | * | 1/2000 | Jennings et al. | 108/161 |
| 6,659,023 B1 | * | 12/2003 | Saltzman et al. | 108/161 |
| 6,837,171 B1 | * | 1/2005 | Clark et al. | 108/161 |

* cited by examiner

*Primary Examiner*—Jose V. Chen
(74) *Attorney, Agent, or Firm*—Lowe, Hauptman & Berner, LLP

(57) ABSTRACT

A process for making a table top includes the steps of mounting a ring-shaped outer mold on a flat surface, mounting a plurality of decorative members which are arranged in a layer on the flat surface and within the outer mold, the decorative members being spaced apart from each other to form gaps thereamong, covering the decorative members with a mesh layer, filling the gaps with a binder and providing a layer of the binder on the mesh layer, and adhering a rigid support plate to the binder.

13 Claims, 6 Drawing Sheets

TABLE TOP AND PROCESS OF MAKING THE SAME

BACKGROUND OF THE INVENTION

1. Field of the Invention

The invention relates to a table top, more particularly to a table top with a strong structure and an appealing appearance and to a process of making the same.

2. Description of the Related Art

Usually, changes are made on the outer contour, surface color, and material quality of a conventional table top to form a desired appearance that matches the indoor or outdoor ambience. As such, the conventional table top usually does not have a strong structure and is not durable.

SUMMARY OF THE INVENTION

Therefore, the main object of the present invention is to provide a table top with a multi-layered structure and the process of making the same.

Another object of the present invention is to provide a table top that has a strong structure and an appealing appearance and the process of making the same.

A further object of the present invention is to provide a table top that includes different decorative members to enhance its appearance and the process of making the same.

According to one aspect of this invention, a process for making a table top comprises the steps of mounting a ring-shaped outer mold on a flat surface, mounting a plurality of decorative members, which are spaced apart from each other to form gaps thereamong, in a layer on the flat surface and within the outer mold, covering the decorative members with a mesh layer, filling the gaps with a binder and providing a layer of the binder on the mesh layer, and adhering a rigid support plate to the binder.

According to another aspect of this invention, a table top comprises a top layer, a cured binder, and a rigid support plate. The top layer includes a plurality of decorative members, which are spaced apart from each other to form gaps thereamong. The cured binder fills the gaps, and forms a layer covering a bottom surface of the top layer. The rigid support plate is adhered to the binder.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
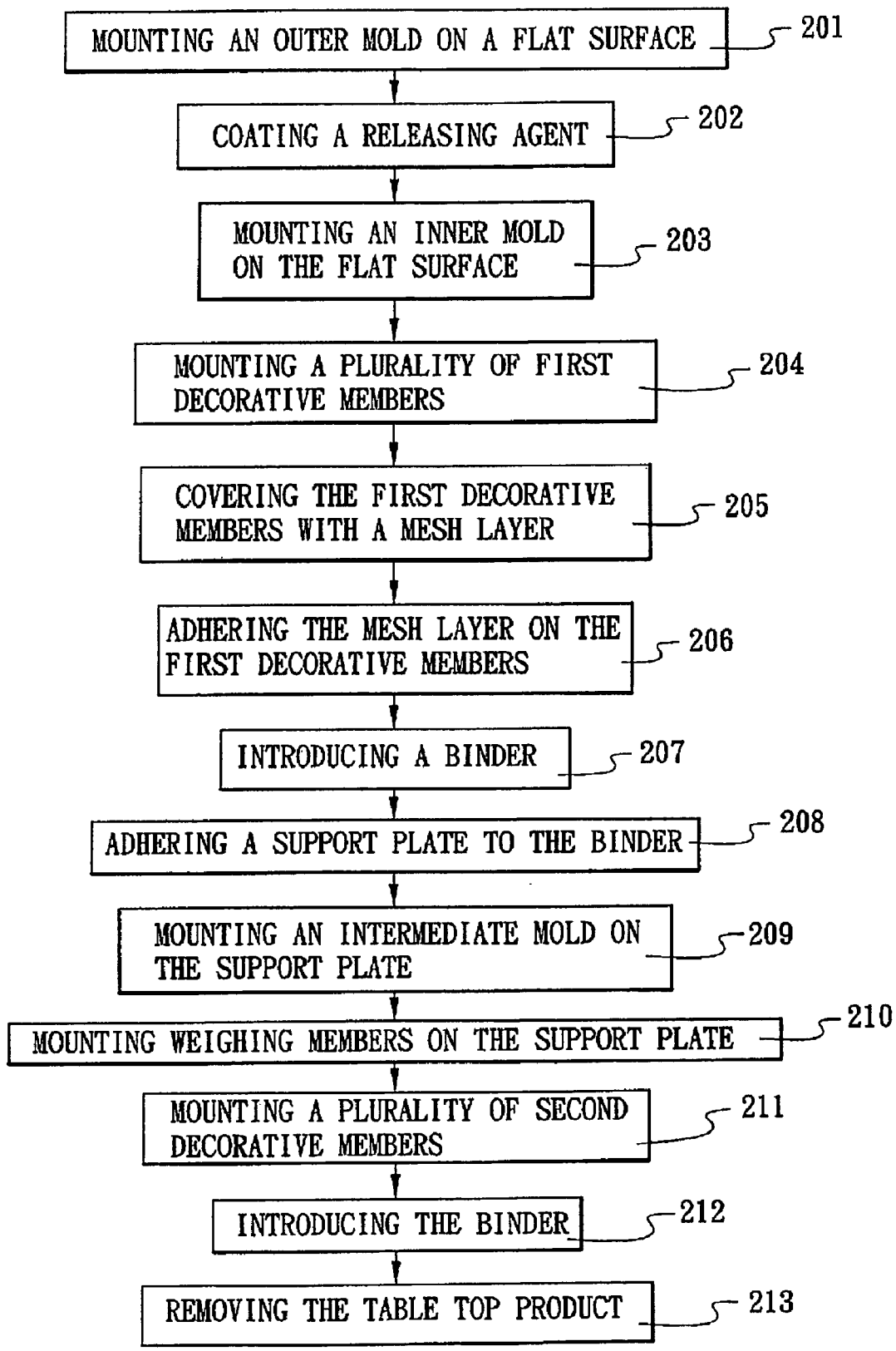
FIG. 1 is a flow chart illustrating the preferred embodiment of the process for making a table top according to the present invention.

The preferred embodiment of the process for making a table top 100 (see FIGS. 9 and 10) according to the present invention comprises the steps shown in FIG. 1.

Figure 2:
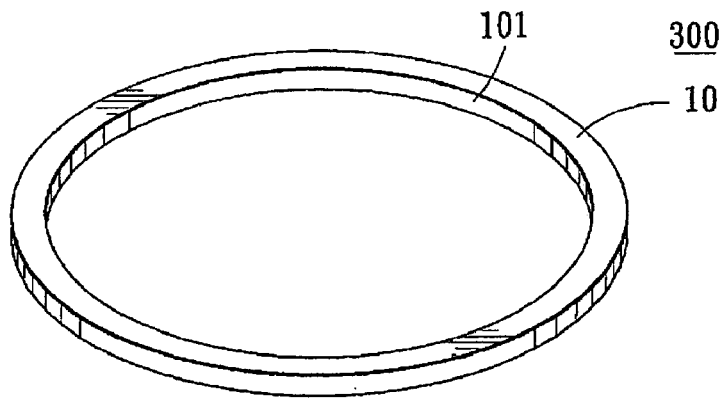
FIG. 2 is a perspective view of an outer mold used in the preferred embodiment.

In step 201, a ring-shaped outer mold 10 is mounted on a flat surface 300. Referring to FIG. 2, in combination with FIG. 1, the flat surface 300 in this embodiment is a floor. However, the flat surface 300 can also be a glass surface, a working platform, or other suitable flat areas. The outer mold 10 is mainly formed from a resin, and has an inner periphery 101 forming a height from the flat surface 300. However, the outer mold 10 is not limited to the shape and material of the disclosed embodiment. It may be square, rectangle, oblong, or any other suitable geometric shape, and may be made from metal, such as steel or iron, wood, or other material. In addition, the flat surface 300 is also not limited to a completely flat surface. The surface may be suitably curved so that a table top 100 (see FIGS. 9 and 10) produced by the process can have a curved outer appearance.

In step 202, the inner periphery 101 of the outer mold 10 and the flat surface 300 within the inner periphery 101 are coated with a wax layer (not shown) or other suitable releasing agent so that when the table top 100 is finally formed, it can be easily separated from the outer mold 10 and the flat surface 300.

Figure 3:
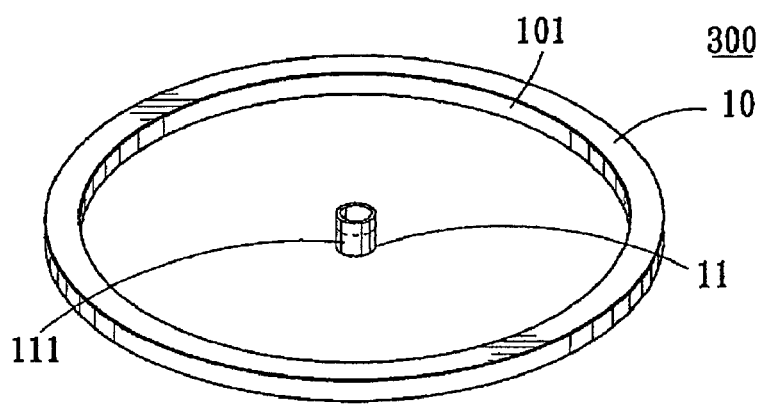
FIG. 3 is a perspective view illustrating an inner mold placed at a center of the outer mold.

In step 203, as shown in FIG. 3, a hollow inner mold 11 made of resin is mounted on the flat surface 300 at the center of the outer mold 10, and is used as a reference for the succeeding processing steps. Outer periphery 111 of the inner mold 11 is similarly coated with a wax layer or other suitable releasing agent. The material and shape of the inner mold 11 are substantially similar to those of the outer mold 10, and the position of the inner mold 11 can be altered according to the shape of the outer mold 10. When the table top 100 is finally formed, the inner mold 11 will be removed to leave a circular hole at a central part of a top layer of the table top 100 for removable insertion of a post of an umbrella body (not shown) therethrough. As such, the table top 100 can be disposed outdoors with the umbrella body serving as a parasol. The table top 100 can also be connected with a plurality of table legs (not shown) or other support units to complete a table body.

Figure 4:
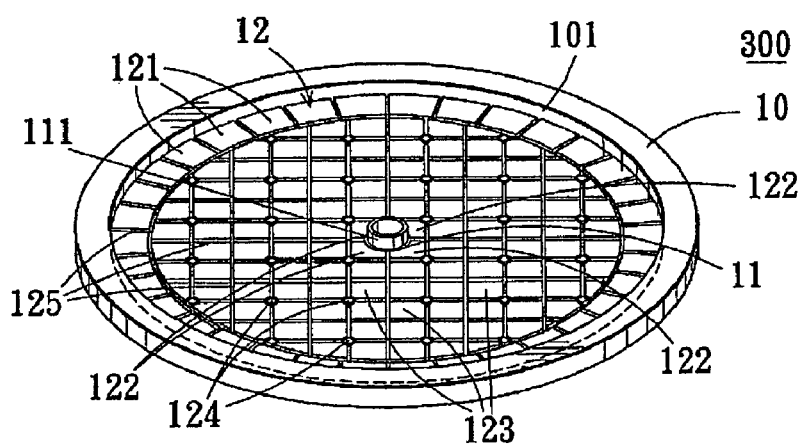
FIG. 4 is a perspective view illustrating first decorative members placed within the outer mold.

In step 204, as shown in FIG. 4, a plurality of first decorative members 12 are arranged in a layer on the flat surface 300 between the outer and inner molds 10, 11 to form the top layer of the table top 100. The appearance of the table top 100 can be enhanced by varying the materials, colors, and shapes of the first decorative members 12. The first decorative members 12 include tiles 121 which are circumferentially mounted proximate to the inner periphery 101 of the outer mold 10, tiles 122 which are disposed around an outer periphery 111 of the inner mold 11, tiles 123 which are mounted between the tiles 121 and 122, and diamond-shaped tiles 124, each of which is provided among four tiles 123. The tiles 121, 122, 123, 124 are spaced apart from each other to form gaps 125 thereamong, and are cut appropriately prior to their mounting on the flat surface 300. In this embodiment, while the first decorative members 12 are tiles 121, 122, 123, 124, they may be made of marble, glass, mosaic, metal, plastic, wood, or other natural or synthetic materials, and can have different shapes and colors.

Figure 5:
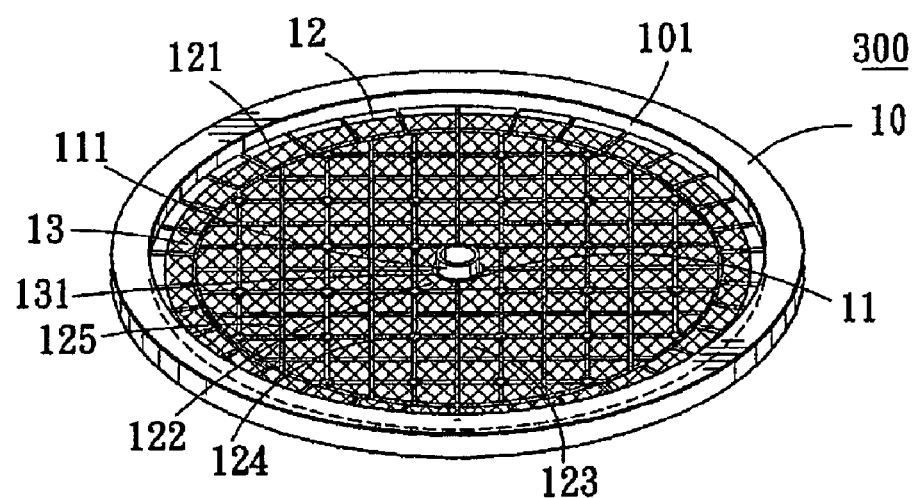
FIG. 5 is a perspective view illustrating a mesh layer placed on the first decorative members.

In step 205, as shown in FIG. 5, a mesh layer 13 is mounted on surfaces of the tiles 121, 122, 123, 124. The mesh layer 13 is circular, and has a dimension slightly smaller than an inner diameter of the outer mold 10, and a central opening 131 for extension of the inner mold 11 therethrough. In this embodiment, the mesh layer 13 has a mesh opening of 5 mm×6 mm, and is a rectangular mesh made of nylon thread. However, the nylon thread can be replaced with other natural or synthetic fiber material. Dimension and shape of the mesh opening can be suitably altered.

In step 206, the mesh layer 13 is adhered fixedly on the surfaces of the first decorative members 12 by means of an adhesive (not shown) so as to facilitate the succeeding processing steps. In this embodiment, the adhesive includes an unsaturated polyester resin and a suitable amount of curing agent, and requires curing time of about ten minutes. Other suitable adhesive or curing agents can be alternatively used.

Figure 6:
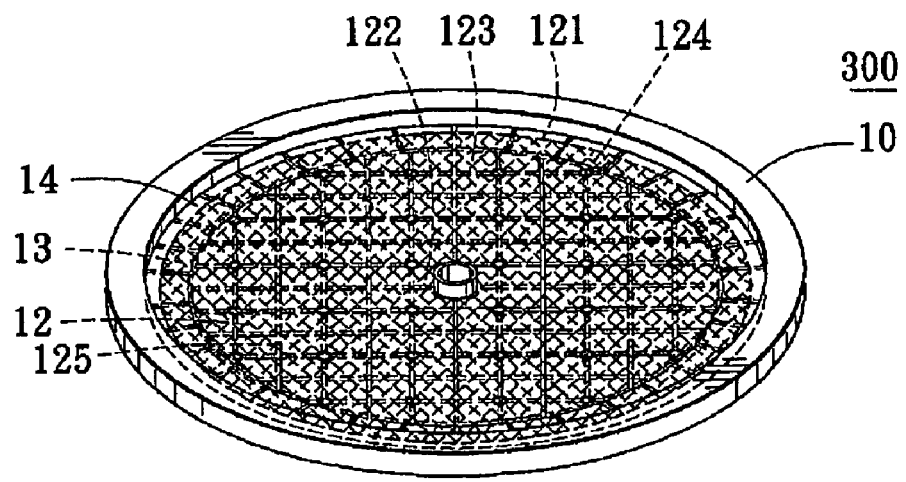
FIG. 6 is a perspective view illustrating a binder layer introduced into the outer mold.

In step 207, as shown in FIG. 6, after the above adhesive is cured, a binder 14 is introduced to fill the gaps 125 among the tiles 121, 122, 123 and 124 and to cover a surface of the mesh layer 13. Thereafter, the surface of the binder 14 is leveled to form a binder layer. In this embodiment, the binder 14 has the same material as the aforementioned adhesive, which includes an unsaturated polyester resin and a suitable amount of curing agent. As such, costs can be minimized.

Figure 7:
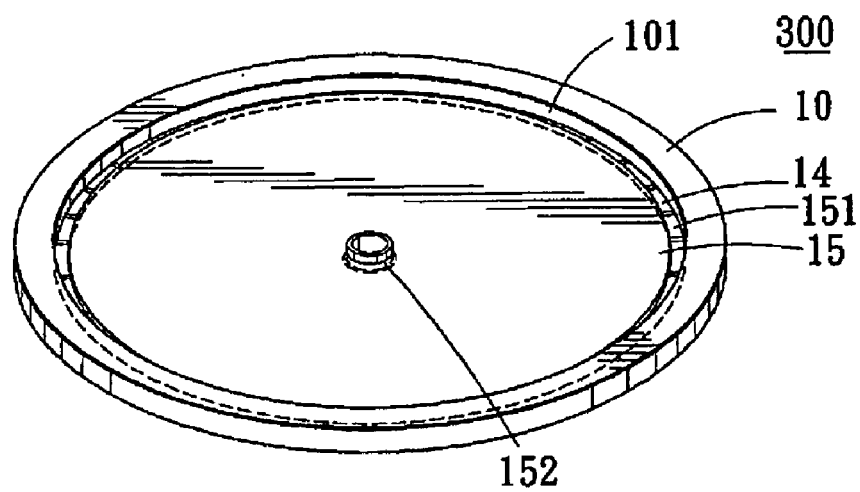
FIG. 7 is a perspective view illustrating a support plate placed over the binder layer.

In step 208, as shown in FIG. 7, a rigid circular support plate 15 is adhered to the binder 14 before the latter is completely cured, and has a cross-section smaller than that of the layer of the binder 14. At this time, the mesh layer 13 is embedded in the binder 14 between the top layer formed of the first decorative members 12 and the support plate 15. The support plate 15 has an outer periphery spaced apart from the inner periphery 101 of the outer mold 10, and forms an annular space 151 from the inner periphery 101 of the outer mold 10. The support plate 15 further has a central hole 152 for extension of the inner mold 11 therethrough. In this embodiment, the support plate 5 is a magnesium silicate plate including magnesium oxide (MgO) as its main component. Alternatively, a gypsum plate or other synthetic plate having a definite hardness or other suitable composite plate can be used. Preferably, the plate material is light and tough.

Figure 8:
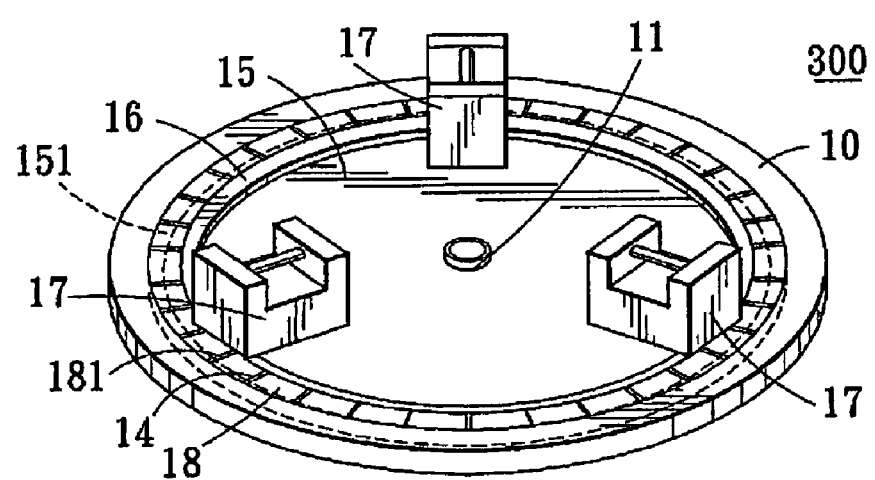
FIG. 8 is a perspective view illustrating weight members provided on the support plate.

In step 209, as shown in FIG. 8, a ring-shaped intermediate mold 16 made of plastic is mounted concentrically along the outer periphery of the support plate 15. The intermediate mold 16 has a cross-section slightly smaller than that of the support plate 15. The shape and material of the intermediate mold 16 are substantially similar to those of the outer mold 10.

In step 210, as shown in FIG. 8, three spaced-apart weight members 17 are mounted circumferentially on the support plate 15 so as to press uniformly and fixedly the support plate 15, the mesh layer 13 (see FIG. 4), and the binder 14 (see FIG. 6) against the first decorative members 12. In this embodiment, the weight members 17 are metal, and weigh 20 kilos each. The weight members 17 are spaced apart from each other at an angular distance of about 120°, but are not limited as such.

In step 211, as shown in FIG. 8, a plurality of spaced-apart second decorative members 18 are bonded to the layer of the binder 14 around an outer periphery of the support plate 15 but within the annular space 151 between the outer and intermediate molds 10 and 16. The second decorative members 18 form a decorative edge for the table top 100 (see FIGS. 9 and 10). The second decorative members 18 are spaced apart from each other to form gaps 181 thereamong. In this embodiment, each of the second decorative members 18 is a tile, which has a cross-section of an inverted-L shape, and has a horizontal portion 182 (see FIG. 11) extending radially and inwardly and situated below the support plate 15, and a vertical portion 183 (see FIG. 11) extending integrally and upwardly from the horizontal portion 183. However, the shapes and materials of the second decorative members 18 can be similar to those of the first decorative members 12.

In step 212, the binder 14 is filled in the gaps 181 so that each second decorative member 18 exerts a pressing force on the outer periphery of the support plate 15 through the binder 14.

Figure 9:
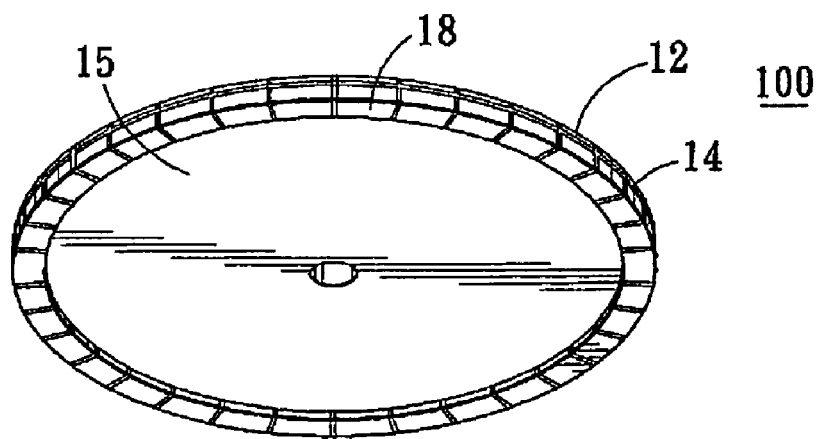
FIG. 9 is a perspective view of a table top produced by the preferred embodiment.
Figure 10:
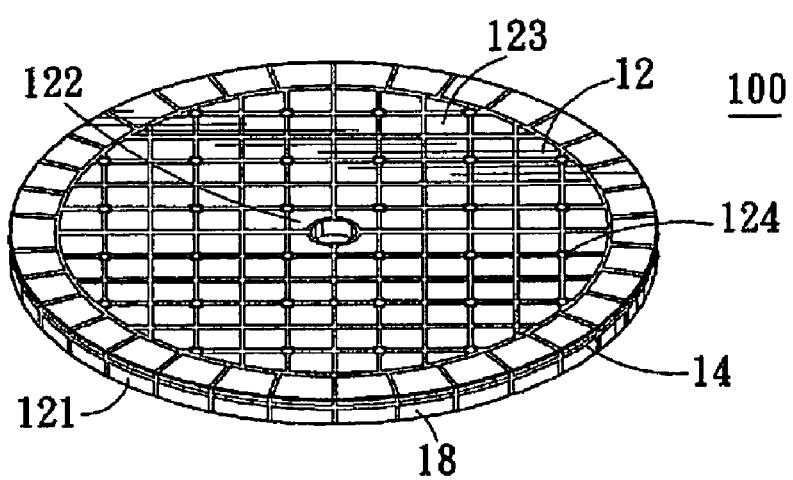
FIG. 10 is another perspective view of the table top of FIG. 9.
Figure 11:
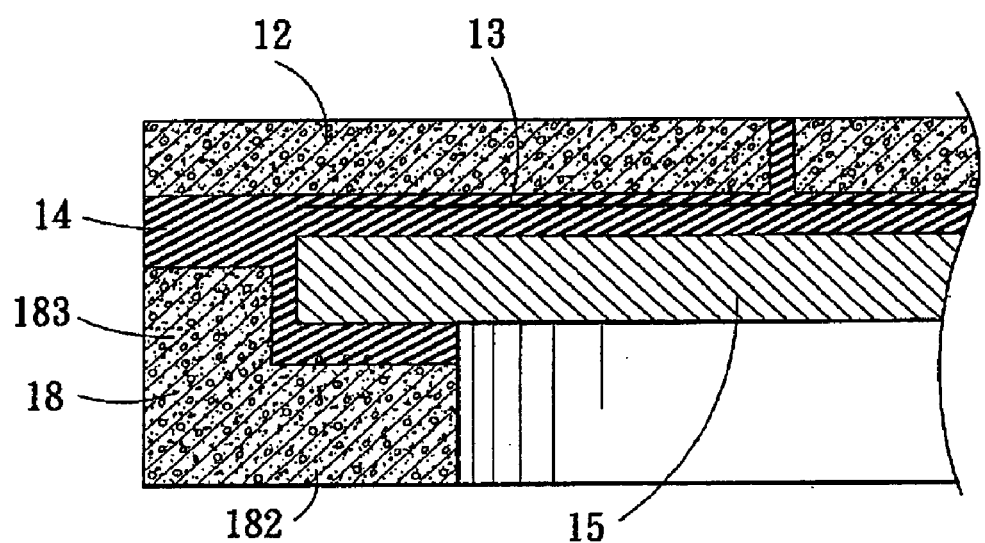
FIG. 11 is a fragmentary schematic sectional view of the table top of FIG. 9.

In step 213, after the binder 14 is cured in the gaps 181 in the second decorative pieces 18, the intermediate mold 16 and the weight members 17 can be removed, and the table top 100 is pulled out of the outer mold 10 and the inner mold 11, and polished and finished in a conventional manner, thereby completing the table top 100 shown in FIGS. 9 and 10. FIGS. 9 and 10 are perspective views as viewed from the bottom and top of the table top 100, respectively FIG. 11 is a sectional view of the table top 100 of FIG. 10. The table top 100 includes the first decorative members 12, i.e., the tiles 121, 122, 123, 124, arranged in a pattern such that the top layer has a circumferential outer periphery. The binder 14 is cured, and extends between adjacent ones of the first decorative members 12. The mesh layer 13 (not shown in FIGS. 9 and 10) is embedded in the cured binder 14. The table top 100 further includes the L-shaped second decorative members 18 that are formed as tiles, each of which is attached to a bottom surface of the layer of the cured binder 14. The second decorative members 18 are disposed along the outer periphery of and below the top layer. The cured binder 14 extends between adjacent ones of the second decorative members 18. The second decorative members 18 protrude downwardly from the bottom of the support plate 15, thus providing a stereo visual effect.

From the aforementioned description of the preferred embodiment of the process of this invention for making the table top 100, a multi-layered structure of the table top 100 is produced so that the table top 100 of the present invention has a strong structure and an appealing appearance. The strong structure of the table top 100 is provided by the first decorative members 12, the support plate 15, and the second decorative members 18 which together form a sandwich-type structure. Furthermore, due to the presence of the cured binder 14 which firmly interconnects the first and second decorative members 12, 18, the table top 100 is reinforced against pulling, pressing and twisting forces. Moreover, due to the composite support plate 15, which is light and tough, the weight of the table top 100 can be reduced so as to lower transport cost.

Additionally, the L-shaped second decorative members 18 provide support and clamping effect to the support plate 15, and cooperate with the mesh layer 13 to provide constraint forces to the first decorative members 12, so that the connection between each layer is more stable. At the same time, because the surface of the table top 100 has the first decorative members 12 and the second decorative members 18 which have various shapes and colors, the appearance of the table top 100 is enhanced as compared to that of the conventional table top.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A process for making a table top, comprising:
   (a) mounting a rings-haped outer mold on a flat surface;
   (b) mounting a plurality of first decorative members which are arranged in a layer on said flat surface and within said outer mold, said first decorative members being spaced apart from each other to form gaps thereamong;
   (c) covering said first decorative members with a mesh layer;
   (d) filling said gaps with a curable binder and providing a layer of said binder on said mesh layer; and
   (e) adhering a rigid support plate to said binder.

2. The process as claimed in claim 1, wherein said support plate has a cross-section smaller than that of the layer of said binder.

3. The process as claimed in claim 2, further comprising mounting a hollow inner mold on said flat surface at a center of said outer mold after step (a).

4. The process as claimed in claim 3, wherein said mesh layer has a central opening, said inner mold passing through said opening.

5. The process as claimed in claim 2, further comprising (if) mounting concentrically a ring-shaped intermediate mold on said support plate after step (e), said intermediate mold having a cross-section smaller than that of said support plate, said intermediate mold cooperating with said outer mold to form an annular space therebetween.

6. The process as claimed in claim 5, further comprising (g) mounting a plurality of spaced-apart second decorative members on said binder within said annular space after step (f).

7. The process as claimed in claim 6, further comprising pressing said support plate against said binder and said first decorative members before step (g) and after step (f).

8. A table top comprising:
   a top layer including a plurality of first decorative members which are spaced apart from each other to form gaps thereamong;
   a cured binder filling said gaps and forming a layer that covers a bottom surface of said top layer;
   a rigid support plate adhered to said binder; and
   a mesh layer embedded in said binder between said top layer and said support plate.

9. The table top as claimed in claim 8, wherein said cured binder includes an unsaturated polyester resin.

10. The table top as claimed in claim 8, wherein said support plate is a composite plate.

11. A table top comprising:
    a top layer including a plurality of first decorative members which are spaced apart from each other to form gaps thereamong;
    a cured binder filling said gaps and forming a layer that covers a bottom surface of said top layer;
    a rigid support plate adhered to said binder, said support plate having a cross-section smaller than that of said layer of said cured binder; and
    a plurality of second decorative members bonded to said layer of said cured binder around an outer periphery of said support plate, each of said second decorative members having a cross-section of an inverted-L shape and a horizontal portion extending radially and inwardly and situated below said support plate.

12. A table top comprising:
    a top layer including a plurality of first decorative members which are spaced apart from each other to form gaps thereamong, said first decorative members being formed as tiles arranged in a pattern such that said top layer has a circumferential outer periphery;
    a cured binder filling said gaps and forming a layer that covers a bottom surface of said top layer, said cured binder extending between adjacent ones of said tiles;
    a rigid support plate adhered to said binder; and
    a plurality of spaced-apart second decorative members, each of which is attached to a bottom surface of said layer of said cured binder, said second decorative members being disposed along said outer periphery of said top layer, said cured binder extending between adjacent ones of said second decorative members, said second decorative members being formed as tiles, each of said tiles of said second decorative members having a cross-section of an inverted-L shape and a horizontal portion extending radially and inwardly and situated below said support plate.

13. The table top as claimed in claim 12, wherein said top layer has a center formed with a hole.

* * * * *